United States Patent [19]

Katagiri et al.

[11] 4,386,554
[45] Jun. 7, 1983

[54] BRAKE BOOSTER

[75] Inventors: Masayoshi Katagiri, Toyota; Osamu Ogura, Nagoya, both of Japan

[73] Assignees: Toyota Jidosha Kogyo Kabushiki Kaisha; Aisin Seiki Kabushiki Kaisha, both of Aichi, Japan

[21] Appl. No.: 216,654

[22] Filed: Dec. 15, 1980

[30] Foreign Application Priority Data

Dec. 28, 1979 [JP] Japan .................. 54-172922

[51] Int. Cl.³ .................................. F15B 9/10
[52] U.S. Cl. ......................... 91/369 A; 91/369 B
[58] Field of Search ............ 91/369 B, 369 A, 369 R, 91/391 A, 376 R

[56] References Cited

U.S. PATENT DOCUMENTS

| | | | |
|---|---|---|---|
| 3,120,155 | 2/1964 | Ayers, Jr. ............ | 91/391 A |
| 4,192,220 | 3/1980 | Tateoka ............... | 91/369 B |
| 4,242,943 | 1/1981 | Nakamura et al. ..... | 91/369 B |
| 4,259,893 | 4/1981 | Ando et al. ........... | 91/369 B |

Primary Examiner—Paul E. Maslousky
Attorney, Agent, or Firm—Parkhurst & Oliff

[57] ABSTRACT

A brake booster of stroke-enlarging type which includes a power piston moved in accordance with the difference of pressure on opposite sides thereof, a control piston having therein a control valve for controlling the pressure difference and slidably fitted in a central bore of the power piston, an anti-backdown transmission mechanism disposed between the two pistons, a reaction lever abutted at an output portion thereof on an output member and, at a pair of input portions located on opposite sides of the output portion, on the control piston and the anti-backdown transmission mechanism respectively, and a return spring backwardly biasing the power piston. The anti-backdown transmission mechanism transmits the output force of the power piston to the reaction lever and the reactionary force of the reaction lever to the power piston in an initial operation stage of the booster, and after an advancing of the power piston in relation to the control piston by a predetermined amount it transmits the reactionary force of the reaction lever not to the power piston but to the control piston. An abutting portion is disposed on the power piston for abutting on the front side of the anti-backdown transmission mechanism for retracting the same to the original position together with the power piston which is forcibly retracted by the return spring.

6 Claims, 6 Drawing Figures

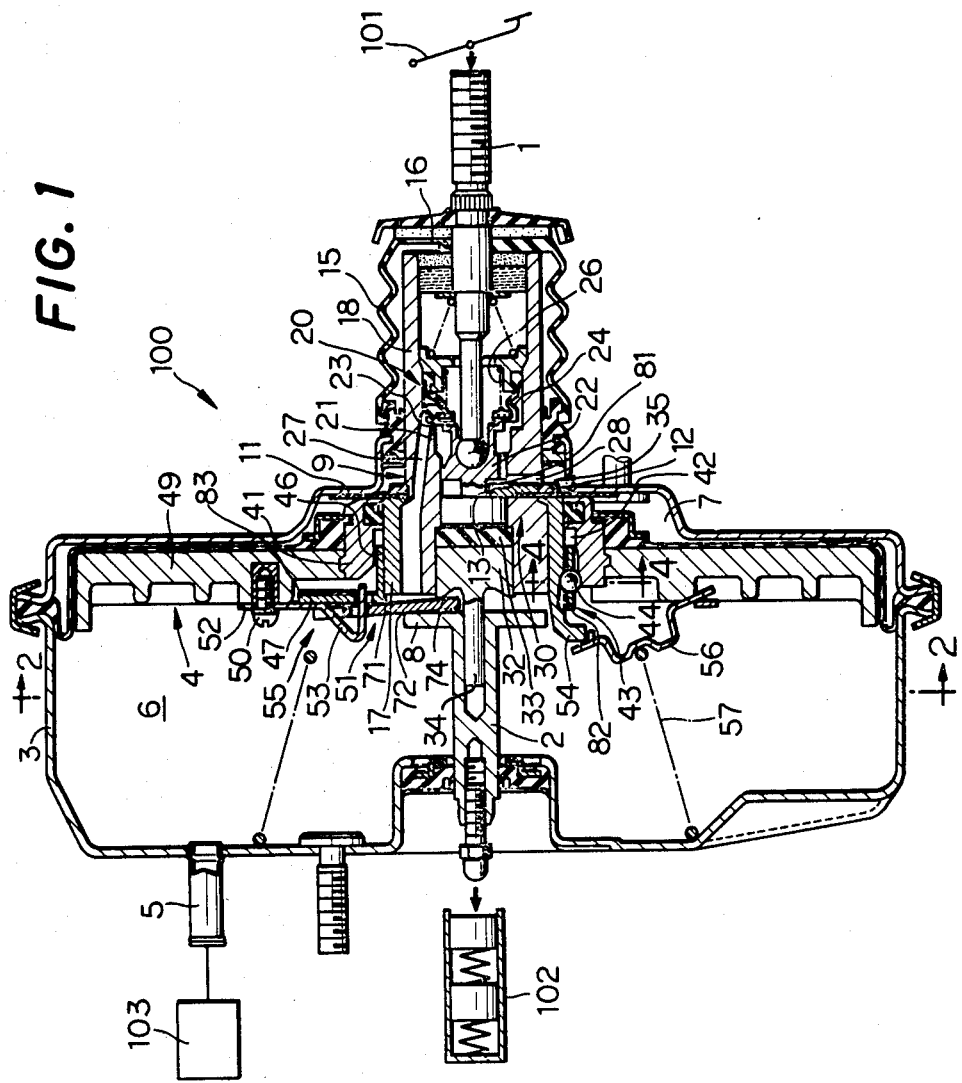

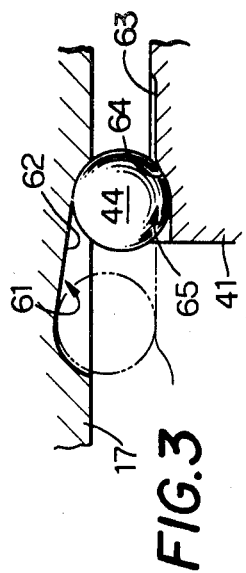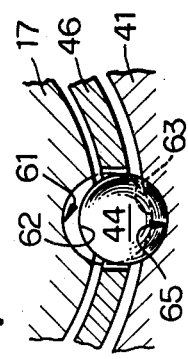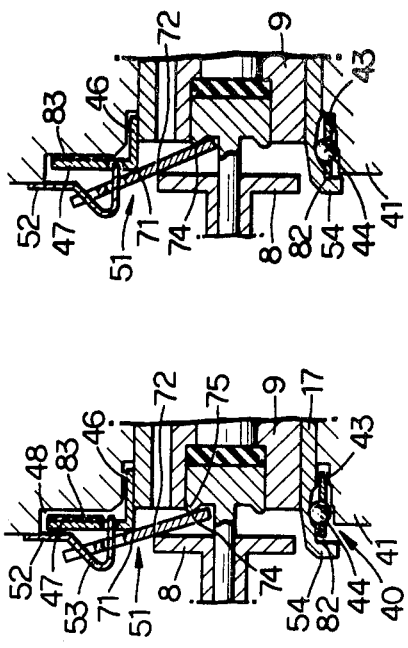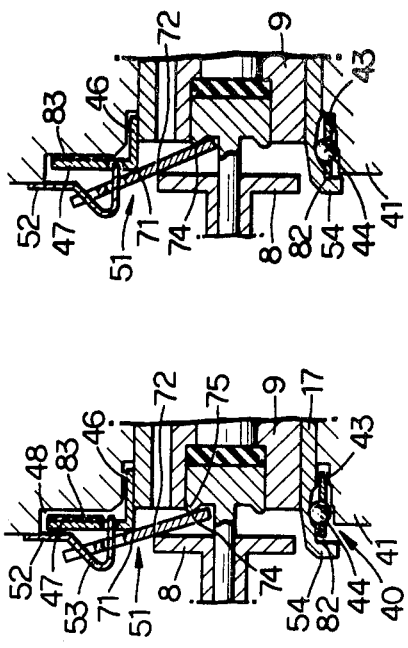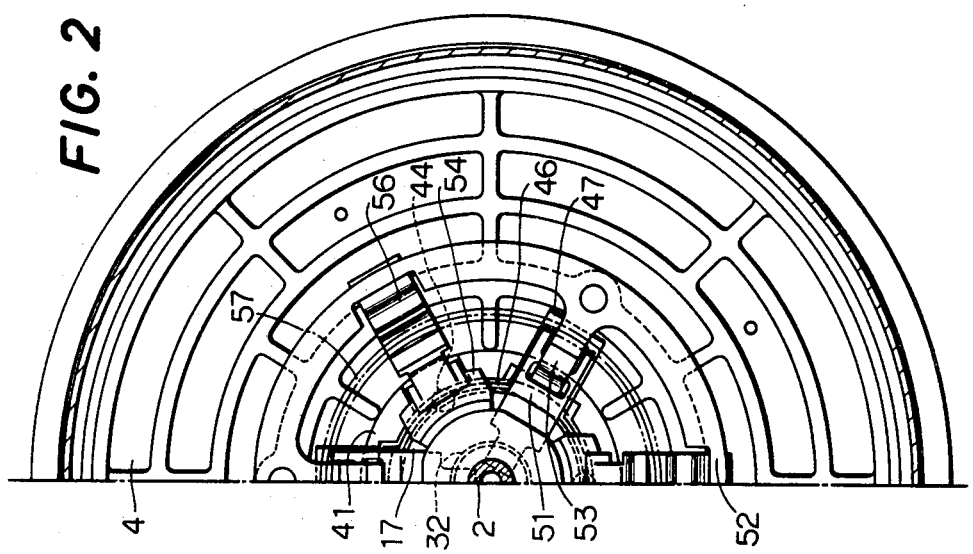

BRAKE BOOSTER

FIELD OF THE INVENTION

This invention relates to a brake booster for boosting brake operational force by utilizing gaseous pressure, and more particularly to an improvement of a stroke-enlarging type brake booster.

BACKGROUND OF THE INVENTION

A stroke-enlarging type brake booster mentioned herein means one wherein a power piston, which is so disposed in a booster casing as to divide the interior of the same into two chambers and actuated by a pressure difference between the two chambers, is separated from a controlling mechanism for controlling the pressure difference upon operation of an input member for being relatively movable to the controlling mechanism. This stroke-enlarging type brake booster is featured in obtaining a larger output stroke than the input stroke, while in ordinary brake boosters the output stroke can never be larger than the input stroke.

The stroke-enlarging type brake booster is still disadvantageous, when there is a certain limit in an assisting or promoting force, i.e., a force produced by the difference of pressure on opposite sides of the power piston, in that an attempt of getting a larger output than a critical output obtained at the upper limit of the assisting force results in a temporary rapid increasing of the input stroke without a resultant increase of the braking force.

A stroke-enlarging type brake booster includes a power piston disposed in a casing to divide a space within the casing into two chambers and moved in accordance with the difference of pressures in the chambers on opposite sides thereof, a control piston which has a control valve for controlling the pressure difference in the two chambers and a transmission mechanism for transmitting an input force of an input member to an output member and which is axially and relatively movably fitted in the power piston, a reaction lever for transmitting a force from the power piston and the transmission mechanism to the output member, and a return spring for biasing the power piston in backward or retracting direction. The reaction lever abuts at an output portion in the middle thereof on the output member and further abuts at one of a pair of input portions located on opposite sides of the output portion, on the transmission mechanism and at the other input portion on the power piston.

In a brake booster of this type an operating stroke of the input member and the transmission mechanism at the initial stage of braking operation is small, but a larger stroke is obtained in the output member than in the input member due to a pivotal movement of the reaction lever which is caused by a stroke of the power piston advanced by an assisting or promoting force generated by the pressure difference. When however the assisting force to the power piston reaches, after the power piston has advanced a certain predetermined amount relative to the control piston, its limit or critical point the power piston begins to be pushed back due to a reactionary force from a master cylinder delivered by way of the reaction lever, which produces the above-mentioned rapid input stroke increasing phenomenon.

The applicants of this invention are two of three co-inventors of a brake booster which was developed with an object of eliminating the above disadvantage. This brake booster has an anti-backdown transmission mechanism which is provided with a ball interposed in a bridging manner between two recesses respectively formed in the internal peripheral surface of the power piston and in the external peripheral surface of the control piston, and a ball retainer for loosely retaining the ball and abutting on the reaction lever. This development is shown in the copending patent application Ser. No. 194,404, filed Oct. 6, 1980.

In this anti-backdown transmission mechanism the reactionary force of the reaction lever is little applied, after the assisting force to the power piston has reached the limit, to the power piston, but mainly applied to the control piston, which effectively prevents the occurrence of the rapid input stroke increasing phenomenon. Even this mechanism could not be perfect in respect of returning movement of the ball retainer to the original position, which was made clear by further study of the applicants of this invention.

The problem resides in that the force causing to return the ball retainer to the original position is the reactionary force of the reaction lever, while the force causing to return the power piston to the original position is the elasticity of the return spring. The reactionary force is fairly large only while the braking is in effect, that is while the power piston and the control piston are considerably away from their original position, but it is inevitably diminished in the final stage of the returning stroke of the power piston. This sort of reactionary force is unreliable and unsuitable as the returning force for the ball retainer. Besides, this way of returning of the ball retainer may possibly cause a time delaying in the returning. The imperfect and delayed returning of the ball retainer to the original position hinders the normal returning of the output member and possibly causes an unexpected positioning thereof in relation to the power piston, which contains a risk of a removal of the ball out of the ball retainer.

SUMMARY OF THE INVENTION

This invention was made, against such a background, with the object of providing an improved brake booster wherein the ball retainer is assured, being completely free from the above-mentioned disadvantage, of its returning to the original position. The gist or essential point of this invention resides in that the power piston or a member attached thereto is so arranged as to abut, when the power piston, the ball retainer and the control piston have been returned to the original position thereof, on the ball retainer or a member attached thereto from the front side.

In a stroke-enlarging type brake booster of this invention, the ball retainer which constitutes the anti-backdown transmission mechanism with the aid of a ball is engaged with the power piston at least when the ball retainer is not sufficiently returned in the returning operation of the power piston which is positively returned to the original position by the biasing force of a return spring, so the ball retainer is assured of its returning to the original position independently of the reactionary force from the reaction lever.

BRIEF DESCRIPTION OF THE DRAWINGS

FIG. 1 is an elevational axial section of an embodiment of a booster in accordance with this invention;

FIG. 2 is a cross section of the embodiment shown in FIG. 1 taken along the section line 2—2 (left half is omitted);

FIG. 3 is an enlargement of an essential part in FIG. 1;

FIG. 4 is a cross sectional view of an essential part in FIG. 1 taken along the line 4—4;

FIG. 5 and FIG. 6 are respectively an explanatory view for explaining the operation of the embodiment shown in FIGS. 1–4.

DETAILED DESCRIPTION OF THE PREFERRED EMBODIMENTS

Detailed description on the preferred embodiments of this invention will be made hereinafter with reference to the appended drawings.

A booster 100 shown in FIG. 1 is to boost an input force applied to an operating rod 1, an input member, before outputting the same from a push rod 2, an output member, to a master cylinder 102.

The booster 100 is provided with an air tight casing 3, whose interior is divided into two chambers by a power piston 4 of diaphragm type. The power piston 4 includes a body portion 49 and an annular member 41 radially inwardly located. One of the two chambers divided by the power piston 4 constitutes a constant pressure chamber 6 which is under negative pressure, being connected to a vacuum source 103 such as an intake manifold of an engine or a vacuum pump by way of a pipe joint 5. The other chamber is a variable pressure chamber 7 which is variable in pressure by being selectively communicated to the constant pressure chamber 6 or the ambient atmosphere by a later described control valve.

In the middle part of the power piston 4 a control piston 50 is provided which has a control valve 20 (valve mechanism) and a transmission mechanism 30.

In other words, into a central bore of the power piston 4 a control piston 9 composed of a body 18 and a cylindrical member 17 secured on the external side of the body 18 is slidably fitted. The control valve 20 is composed of a first valve seat 21 formed on the control piston 9, a second valve seat 23 formed on a valve plunger 22 slidably fitted in the control piston 9, and a valve element 24 of elastic material disposed commonly to those two valve seats 21, 23. The valve element 24 is biased to both valve seats 21, 23 by the action of a compression spring 26. In the control piston 9 respective air inlet passages 27 and 28 communicating with the constant pressure chamber 6 and the variable pressure chamber 7 are formed. In a groove formed in communication with the air inlet passage 28 and wider than that, a stopper 13 is inserted to restrict the advancing end and the retracting end of the valve plunger 22. An E shape ring 12 prevents removing of the stopper 13 out of the inserted place. The E shape ring 12 simultaneously functions to lock a stopper plate 11 which is abuttable on the rear wall of the casing 3 for restricting the retracting end of the control piston 9. A projecting portion of the control piston 9 from the casing 3 is completely covered by a boot 15, whose end portion is provided with an air inlet port 16.

On the other hand, a first transmission mechanism 30 includes the valve plunger 22 fixed on the tip of the operating rod, a large plunger 32 fitted into the control piston 9, and a reaction disc 33 of rubber interposed between the valve plunger 22 and the large plunger 32. The reaction disc 33 functions, while allowing a slight relative movement of the valve plunger 22 and the control piston 9, to transmit the resultant force applied from the both to the large plunger 32. The large plunger 32 is provided with a rod portion 34 projecting from the central part thereof for retaining the rear end of the push rod 2.

As shown in FIG. 1 and FIG. 2 (wherein right half only is illustrated because the left half is entirely symmetrical to the former), a counter bore (a larger diametered portion) 42 is formed on the front side of the power piston 4 wherein an anti-backdown transmission mechanism 40 which is composed of a plurality of balls 44 (3 in this embodiment) and a ball retainer 43 for loosely retaining the balls is disposed.

More particularly, as illustrated in FIGS. 3 and 4, there are formed in the external peripheral surface of the cylindrical member 17 three first ball accommodating grooves or recesses 61 extending in the axial direction of the control piston and having an arcuate cross sectional shape having the same radius of curvature as the ball 44, and each bottom surface of the grooves 61 constitutes a first slope (inclined) surface 62 which progressively approaches the axis of the control piston 9 as viewed in the axial direction toward the push rod 2, i.e., leftward in FIG. 3.

On the other hand, three second ball accommodating grooves 65 extending in the axial direction of the power piston 4, with a similarly arcuate sectional shape as the first ball accommodating groove 61, are formed in the internal peripheral surface of the annular member 41. Each bottom surface of the second ball accommodating grooves 65 is provided with a second slope surface 64 acting as a ball driving surface, which is inclined so as to be the more distance away from the axis of the control piston 9 at the more forwardly located position (to be more concrete a curved surface with an identical radius of curvature as the ball 44), and a parallel surface 63 acting as a ball locking surface which is formed on the rear side thereof in parallel to the axis of the control piston 9.

A ball retainer 43 which is a member of a second transmission mechanism is composed, as clearly shown in FIG. 2, of a cylindrical portion 46 of thin wall and three abutting flanges 47 formed outwardly at a right angle. To the forward end surface of the cylindrical portion 46 and the rear end surface of the abutting flanges 47 thin rubber plate 82 and 83 are respectively attached fixedly. Three reaction levers 51 are interposed respectively between the three abutting flanges 47 and the large plunger 32, and a reaction plate 8 on the rear end of the push rod 2. To the power piston 4 a lever retainer 55, composed of an annular body portion 52 and three bent tongues 53 extending toward the axis of the power piston, is attached by being fastened at the body portion 52 with a small screw 50. The bent tongue 53 is bent as to form two sides of a triangle from the root to the tip thereof, and is engaged at its root portion with a notch formed at one end portion of reaction lever 51, and furthermore is fitted at the tip portion thereof into an opening formed in the reaction lever 51 for retaining the same. The lever retainer 55 is so made as to abut, at a part near the root of the bent tongue 53, on the abutting flange 47 of the ball retainer 43.

And the cylindrical member 17 is provided on the forward end thereof with three outward flanges 54. Between the middle portion of each of three spring receivers 56 which is contacted at one end thereof with the flange 54 and inserted at the other end thereof between the power piston 4 and the lever retainer 52, and the forward wall of the casing 3 at the opposed position to the spring receiver 56, a compression coil type return spring 57 is spanned.

The operation mode of this embodiment will be explained hereunder. In a state of non-depressing of a brake pedal 101, the second valve seat 23 is in contact with the valve element 24 while the first valve seat 21 is not. Thus, the variable pressure chamber 7 is in communication with the constant pressure chamber 6 so as to maintain both chambers 6, 7 at an equal negative pressure, producing no pressure difference between opposite sides of the power piston 4. Both the power piston 4 and the control piston 9 are under the biasing force from the spring 57 via the spring receiver 56, rendering the stopper plate 11 abutted on the casing 3. The power power piston 4 which is abutted on the stopper plate 11 is kept at the original position. At this time the bent tongue 53 of the lever retainer 55 is abutted at the root portion thereof on the abutting flange 47 of the ball retainer 43.

A slight depressing of the brake pedal 101 in this state, with a slight forward advancing of the operating rod 1 (leftward movement in FIG. 1), makes the first valve seat 21 contact the valve element 24 by removing the second valve seat 23 therefrom. The variable pressure chamber 7 will be consequently separated from the constant pressure chamber 6 to be in communication with the ambient atmosphere. Between the constant pressure chamber 6 and the variable pressure chamber 7, where the air comes in from outside, a pressure difference is naturally created so as to relatively move the power piston 4 to the control piston 9.

While the power piston 4 is in advancement, the ball 44 and the ball retainer 43 are advanced forwardly by the force coming to the ball 44 via the ball driving surface, i.e., the second slope surface 64 of the annular member 41. By the advancing of the ball retainer 43 a force is applied on a second input portion 71 of the reaction lever 51 so as to cause the reaction lever 51 to be rotated, as shown in FIG. 5, by assuming an output portion 75 of the large plunger 32, where a first input portion 74 of the reaction lever 51 is in contact, as the fulcrum, which results in imparting a driving force of the power piston 4 to the reaction lever 51 via the anti-backdown transmission mechanism 40. Consequently a driving or propelling force is applied from an output portion 72 in the middle to the push rod 2 via the reaction plate 8. Due to the driving force, braking fluid in the master cylinder 102 is supplied to the not-shown braking system, with a result of compensating the consumed fluid amount caused by the extinction of the brake clearance and the initial deformation of the piston cup and others. It means a much larger output stroke is obtained than the input stroke applied.

In this initial operation stage the reactionary force of the reaction lever 51 is transmitted to the power piston 4 by way of the anti-backdown transmission mechanism 40.

When the braking effect begins to appear due to the going out of existence of the brake clearance the cylindrical portion 46 of the ball retainer 43 abuts, as shown in FIG. 6, on the flange 54 of the cylindrical member 17 via the rubber plate 82 to stop the ball retainer 43 from advancing and the power piston 4 advances by a predetermined amount relatively to the control piston 9 so as to make the ball 44 unretractable, being sandwiched or pinched between the first slope surface 62 and the parallel surface (the ball locking surface) 63, as shown in FIG. 3 with two-dot-chain lines. And the ball retainer 43 loosely retaining the ball 44 becomes incapable of moving either forwardly or backwardly in relation to the control piston 9. After the abutment of the power piston 4 on the abutting flange 47 of the ball retainer 43 the operating rod 1 and the power piston 4, while sharing the load at the ratio determined by both of the reaction lever 51 and the reaction disc 33 just like in the conventional brake boosters, advances the push rod 2.

If the brake pedal 101 is, after the limit of the pressure difference on opposite sides of the power piston has been reached, depressed strongly furthermore the first input portion 74 of the reaction lever 51 receives a major force from the output portion 75 of the large plunger 32 to cause the reaction lever 51 to be rotated, assuming the reaction plate 8 as the fulcrum on which the output portion 72 of the reaction lever 51 is abutted, so as to push the ball retainer 43 backwards. At this moment, however, the ball retainer 43 is as mentioned earlier non-movable in relation to the control piston 9, imparting no force to the power piston 4 in the axial direction. The reactionary force of the reaction lever 51 is transmitted to the control piston 9 by way of the anti-backdown transmission mechanism 40. No matter how large the pedal depressing force may be the power piston 4 is not retracted relative to the control piston 9, causing no idle stroke on the brake pedal 101 at all, that is to say, the so-called rapid input stroke increasing phenomenon does not take place.

At this stage the valve plunger 22 is abutted on the stopper 13 to be restricted of its forward movement. After this abutment the operating rod 1, the valve plunger 22, the control piston 9, the large plunger 32, the reaction disc 33, the ball retainer 43, and the reaction lever 51 are all combined into an integral body to advance forward the push rod 2 via the reaction plate 8. The output stroke is increased at this stage in a same amount as the input stroke. Since the assisting force to the power piston 4 has already reached the limit at this moment the output of the booster can never be increased beyond the increase of the brake operational force.

Upon releasing of the depression of the brake pedal 101, the valve element 24 comes into contact with the second valve seat 23, leaving the first valve seat 21, rendering the variable pressure chamber 7 closely sealed by means of its separation from the ambient atmosphere and placing the same in communication with the constant pressure chamber 6 instead. No assisting force is applied in this state on the power piston 4. So the power piston 4 and the control piston 9 are retracted in unison or integrally by the biasing force of the spring 57 which is imparted by way of the spring receiver 56 until the stopper plate 11 abuts on the casing 3 and the control piston 9 is restored to the original position. Thereafter the power piston 4 alone is retracted for releasing the engagement of the parallel surface 63 and the ball 44. The power piston is retracted until it abuts on the stopper plate 11 at the original position thereof. The amount of retraction of the power piston 4 in the meantime equals to the relative movement amount to the control piston 4 during the advancing period.

At the time of this retraction of the power piston 4 the biasing force of the spring 57 is applied to the ball retainer 43 via the bent tongue 53 of the lever retainer 55. Even if the returning force which comes by way of the reaction lever 51 is not large enough, the ball retainr 43 alone cannot stay or be left at the advanced position, but it is forcibly returned to the original position.

It is however possible, of course, to make the ball retainer 43 retract in parallel with the power piston 4 by means of increasing the reactionary force applied through the push rod 2 and the reaction lever 51 from the master cylinder 102. In such a case the lever retainer 55 is usually abutted on the ball retainer 43 simultaneously with the returning of the same to the original position. If the lever retainer 55 should be abutted thereon by chance before the returning of the ball retainer 43 to the original position, it would be attributable to any abnormal cause of blocking the retraction of the ball retainer 43. It can be said that the lever retainer 55 and the abutting flange function as a safety device. In any case, the root portion of the bent tongue 53 of the lever retainer 55 is maintained at a state shown in FIG. 1 where the power piston 4 and the ball retainer 43 are restored to the original position, in abutment on the abutting flange 47 of the ball retainer 43 from front side.

The above description is made on one embodiment of this invention, which should be interpreted by no means to limit the invention to this embodiment alone. It goes without saying that various alterations and modifications can be made to those skilled in the art within the spirit of the invention.

For example, it is permissible to form an abutting portion on the power piston 4, instead of attaching a separate member for that purpose thereon such as a lever retainer 55. On the contrary, the ball retainer 43 may be separated from the abutting flange 47, instead of being integrally formed therewith, that is, to separate the same into two parts, i.e., a body portion and a separately made abutting piece.

The source of the assisting or promoting force is also changed in various ways. For example, it may be obtained from the difference of pressure between the atmospheric pressure and a positive pressure, and a way of getting the pressure difference between one chamber constantly set at the atmospheric pressure and the other chamber selectively settable at the atmospheric pressure or a negative pressure, as disclosed in the U.S. Pat. No. 3,110,031, is permissible.

This invention is also applicable to a stroke-enlarging type brake booster, wherein a compression spring is spanned between the power piston and the control piston, which is disclosed in TOKU-KAI-SHO-No. 54(1979)-99875 (Japanese patent application laid open to public).

As a medium for transmitting a resultant force of the control piston and the valve plunger to the large plunger while allowing the relative movement therebetween, the reaction disc earlier mentioned is preferable, but it may be replaced by a lever or the like. Even omitting the same, as disclosed in the U.S. Pat. No. 4,100,839 is also possible.

What is claimed is:

1. A brake booster comprising:
    a casing;
    an axially movable input member for receiving an input force;
    an axially movable output member for providing a boosted output force;
    a power piston axially movably disposed in said casing between said input and output members to divide the interior of said casing into two chambers, said power piston being moved in accordance with a difference of pressure between the two chambers and having an axially formed central bore;
    a control piston having therein a control valve for controlling the difference of pressure between said two chambers and a first transmission mechanism for transmitting said input force from said input member to said output member, said control piston being coaxially fitted in said central bore and axially movable relative to said power piston;
    at least one reaction lever having an intermediate output portion, a first input portion and a second input portion located on opposite sides of said output portion thereof, said output portion abutting on said output member, and said first input portion abutting on said first transmission mechanism;
    a second transmission mechanism having at least one ball interposed between two recesses formed in the internal peripheral surface of said power piston and in the external peripheral surface of said control piston, respectively, and a ball retainer loosely retaining the ball and abutting on said second input portion of said reaction lever, said second transmission mechanism transmitting an output force of said power piston to said reaction lever and a reactionary force of said reaction lever to said power piston in an initial operation stage of said booster, and transmitting said reactionary force of said reaction lever to said control piston after advancement of said power piston relative to said control piston by a predetermined amount;
    a return spring for backwardly biasing said power piston toward said input member; and
    at least one first abutting portion disposed on said power piston and abutting on a corresponding second abutting portion of said ball retainer on the front side thereof when said power piston, said ball retainer and said control piston are retracted to the original positions thereof.

2. A brake booster according to claim 1, wherein said first abutting portion is a tongue piece extending radially toward the axis of said control piston from said power piston.

3. A brake booster according to claim 1, which further comprises a lever retainer fixed to said power piston for movably retaining said reaction lever and including a lever-retaining tongue extending radially of said power piston, and wherein one part of said lever retainer adjacent to the root of said lever-retaining tongue comprises said first abutting portion.

4. A brake booster according to claim 3, wherein said lever-retaining tongue is bent to form two sides of a triangle in another part thereof remote from said one part, and said reaction lever having a notch formed at one end portion thereof, and further having an opening formed in a middle portion thereof, one of said two sides engaging said notch and the other of said two sides engaging said opening.

5. A brake booster according to claim 1, wherein said ball retainer includes a cylindrical body and a flange extending radially outwardly from said cylindrical body, said flange comprising said second abutting portion.

6. A brake booster comprising:
    a casing;
    an axially movable input member for receiving an input force;
    an axially movable output member for providing a boosted output force;
    a power piston axially movably disposed in said casing between said input and output members to divide the interior of said casing into two pressure chambers, said power piston being moved in accordance with a difference of pressure between said two pressure chambers and having an axially formed central bore;

a control piston having therein a control valve for controlling the difference of pressure between said two pressure chambers and a transmission mechanism for transmitting said input force from said input member to said output member, said control piston being coaxially received in said central bore and axially movable relative to said power piston;

at least one ball associated with the external peripheral surface of said control piston and the internal peripheral surface of said power piston defining said central bore, said external peripheral surface having a recess whose depth increases in the direction toward said output member, said internal peripheral surface including at least one ball driving surface and further including at least one ball locking surface parallel to the axis of said control piston, said ball being partly accommodated in said recess and engaging said driving and locking surfaces such that said driving surface drives said ball together with said power piston while said power piston is advanced relative to said control piston and such that said locking surface prevents said ball from radially moving off the bottom surface of said recess after said power piston is advanced by a predetermined distance;

a ball retainer axially movably disposed between said external peripheral surface and said internal peripheral surface and having a through hole in which said ball is loosely fitted;

at least one reaction lever having an intermediate output portion, a first input portion and a second input portion located on opposite sides of said output portion thereof, said output portion abutting on said output member, and said first and second input portions abutting on said transmission mechanism and said ball retainer;

a return spring for biasing said power piston toward said input member; and at least one first abutting portion disposed on said power piston and abutting on a corresponding second abutting portion of said ball retainer on the front side thereof when said power piston, said ball retainer and said control piston are retracted to the original positions thereof.

* * * * *